United States Patent [19]

Mizutani et al.

[11] Patent Number: 4,767,725

[45] Date of Patent: Aug. 30, 1988

[54] CRYSTALLIZED GLASS-CERAMIC MOLDED PRODUCT AND METHOD OF MANUFACTURING

[75] Inventors: Toyonobu Mizutani, Seto; Masao Yoshizawa, No. 6-6, 5-chome, Higashikaigan-Kita, Chigasaki-shi, Kanagawa-ken; Toichiro Izawa, Matsudo, all of Japan

[73] Assignee: Masao Yoshizawa, Kanagawa, Japan

[21] Appl. No.: 815,107

[22] Filed: Dec. 31, 1985

[30] Foreign Application Priority Data

Dec. 31, 1984 [JP] Japan ................. 59-276392

[51] Int. Cl.$^4$ .............. C03C 10/16; C03C 1/06
[52] U.S. Cl. ......................... 501/3; 501/32; 106/DIG. 3
[58] Field of Search ............ 501/3, 32, 16, 17, 25, 501/151; 106/DIG. 3

[56] References Cited

U.S. PATENT DOCUMENTS

| | | |
|---|---|---|
| 4,386,162 | 5/1983 | Beall ................. 501/3 |
| 4,390,634 | 6/1983 | Hoda ................. 501/3 |

FOREIGN PATENT DOCUMENTS

| | | |
|---|---|---|
| 0076692 | 4/1983 | European Pat. Off. . |
| 2220488 | 10/1974 | France ................. 501/3 |
| 56-69272 | 10/1981 | Japan ................. 501/3 |
| 58-176140 | 10/1983 | Japan . |
| 58-194756 | 11/1983 | Japan ................. 501/32 |
| 59-45941 | 3/1984 | Japan ................. 501/32 |
| 60-5039 | 1/1985 | Japan ................. 501/32 |

*Primary Examiner*—Mark L. Bell
*Assistant Examiner*—Ann M. Knab
*Attorney, Agent, or Firm*—Armstrong, Nikaido, Marmelstein & Kubovcik

[57] ABSTRACT

A crystallized glass-ceramic molded product having a glass matrix and crystallized calcium fluoride and fluormica dispersed therein. The molded product is prepared by mixing and melting together the necessary constituents for forming the glass, calcium fluoride and fluormica and rapidly cooling the melt to produce a frit. Particles of the frit or of two or more frits are then subjected to sintering and crystallizing heat treatments.

11 Claims, No Drawings

CRYSTALLIZED GLASS-CERAMIC MOLDED PRODUCT AND METHOD OF MANUFACTURING

BACKGROUND OF THE INVENTION

1. Field of the Invention

This invention relates to crystallized glass-ceramic molded products suitable for application to ornamental objects such as furniture, interior or exterior walls, floors, pillars, ceilings or the like of building materials and a method of manufacturing such molded products.

2. Description of Material Information

A conventional crystallized glass-ceramic molded product previously put into practical use has an appearance similar to natural marble of white-color series, and has a structure in which light diffusing white crystals of glasses such as $\beta$-wollastonite or the like are produced in a colored or colorless glass matrix. A white colored appearance results.

Thus, there have not been obtained so far any artificial stones having various patterns in the form of spots, streaks, clouds, or other shapes in various colors, and which give the appearance or impression of colors and patterns of natural stones such as marble with blue and white spots or black and white spots; granite with red, blue, black and white spots; agate, granite with light red or cobalt spots, or the like.

In order to produce crystallized glass-ceramic molded products having, as desired, not only the appearance of natural stones, but also the artistic appearance of ones which do not occur in nature, the inventors of this application carried on various research and made an invention as disclosed in Japanese Kokai Patent Publication No. Showa 58-176140. The invention disclosed in the foregoing publication relates to a crystallized glass-ceramic molded product and method for manufacturing the product. According to this prior invention, there can be obtained various products provided with various colors and various patterns as desired, by a method wherein constituent materials for producing conventional glass and constituent materials for producing coloring fluormicas are mixed together and a mixture thereof is heated so as to fuse and the mixture is then cooled and solidified to form frit. Particles of different kinds of frits thus produced are mixed together and molded and then subjected to a sintering treatment and a crystallizing heat-treatment so that crystals of the colored fluormicas are precipitated in the glass matrix. The resultant products have multiple colors and patterns which are produced by reflecting incident light beams projecting into the product from the crystals of the colored fluormicas.

Using this prior invention, there have been developed crystallized glass-ceramic products having multiple colors and patterns. However, the difference between the refractive index (1.51–1.57) of the crystals of fluormica and that (1.49–1.55) of the glass is very small. Additionally, the shape of the fluormica is a thin scale, or flake, and most of the fluormica particles in the product are 0.3–1.0 micron in diameter, the thickness being 1/10–1/30 of the diameter. Consequently, the amount of reflected incident light from the crystals of the fluormica is very small and the amount of light passing therethrough is very large, and accordingly visibility of the multiple colors and patterns of the product is poor. In order to give distinct, visible multi-colors and patterns it is necessary to add a large amount of the constituent materials for producing fluormicas and to increase the amount of fluormicas produced so that incident light may be given multi-reflections by the increased amount of the produced fluormicas.

The fluormicas of the fluorophlogopite system, $KMg_3(AlSi_3O_{10})F_2$, which is one of the groups that includes mostly coloring fluormicas, are good in crystallizing out of the constituent materials thereof within the glass in a high temperature range of above 800° C., but poor in a low temperature range of 550°–800° C. In addition, as to the fluormicas of the fluoromuscovite system and those of tetrasilic fluormica system, $KMg_{2.5}(Si_4O_{10})F_2$, crystals thereof can be produced out of the constituent materials thereof but the amount produced is poor.

It is an object of the present invention to improve the prior invention and to provide crystallized glass-ceramic molded products displaying distinct single or multi-colors and various patterned appearances and a method of making the products.

SUMMARY OF THE INVENTION

According to the present invention, there is provided a crystallized glass-ceramic molded product composed of glass, fluormica and calcium fluoride. The molded product is prepared by mixing constituent materials for producing at least one kind of glass, constituent materials for producing at least one kind of fluormica and constituent materials for producing calcium fluoride, heating the mixtures to melt the materials and cooling and solidifying the mixture to form at least one kind of frit. Pieces of at least one kind of frit are charged into a mold and subjected to a sintering treatment and a crystallizing heat-treatment so that there is manufactured a crystallized molded glass-ceramic product including crystals of fluormica and crystals of calcium fluoride. Other calcium compounds such as calcium silicates or the like are produced as by products in the frit.

DESCRIPTION OF PREFERRED EMBODIMENTS

In the method of this invention, the manner of the sintering treatment and the crystallizing heat-treatment are divided into the following three procedures:

(1) The frit particles are sintered and then a resultant sintered body is subjected to the crystallizing heat-treatment. (2) Before being subjected to the sintering treatment the frit particles are subjected to the crystallizing heat-treatment and then the crystallized frit particles are subjected to the sintering treatment and then subjected again to the crystallizing heat-treatment, that is, recrystallizing heat-treatment. (3) The frit particles are subjected to the sintering treatment and the crystallizing heat-treatment at the same time. In any of the above procedures, it is important to obtain the frit particles including crystals of fluormica(s) and crystals of calcium fluoride.

The term "emulsion" is used because the dispersed condition of innumerable fine crystals of calcium compound appears cloudy or milky white like the appearance of the emulsion of innumerable fine particles of oil and fat suspended in water or milk.

The frit obtained by the foregoing crystallizing heat-treatment has a structure wherein in the glass matrix, crystallized calcium fluoride is dispersed in the form of an emulsion and in the emulsion thereof there coexist uniformly dispersed fluormica crystals.

The calcium fluoride produced is a granulated crystal in the form of a hexahedron or octahedron, and has a refractive index of 1.43. Most of the crystals thereof are 0.3–1.5 micron in particle or grain diameter. The calcium compounds other than calcium fluoride are various kinds of calcium silicates which are the natural by-products of reactions of some of the compounded constituent materials for making the frit, by the crystallizing heat-treatment. Those calcium silicates are various calcium compounds such as fluorotremonite $Ca_2Mg_5Si_8O_{22}F_2$, fluorolihiterite $CaNa_2Mg_5Si_8O_{22}F_2$, a minor amount of fluoroedinite $NaCa_2Mg_5AlSi_7O_{22}F_2$ and other compounds of the amphibole system, or other complexed inconstant or unstable compounds of $CaO$—$SiO_2$, $CaO$—$MgO$—$SiO_2$, and $CaO$—$SiO_2$—$Al_2O_3$—$F$ systems, etc., which are transiently produced.

Calcium fluoride is colorless where it does not include any impurities, but, in the case of this invention, a coloring source such as Fe, Cu, Co, Ni, Mn, Ti or the like is included as an element of the constituent materials for forming the composition of the fluormica and the metallic ion is taken in by the calcium fluoride produced. The calcium fluoride crystal bears the metallic color.

Thus, a characteristic feature of this invention is that the calcium fluoride crystals in the emulsion state and the coloring fluormica crystals coexist in a homogeneously mixed state. Owing to the fact that the calcium fluoride crystals are cubic crystals, that there is a significant difference between the refractive index of calcium fluoride and that of the glass matrix and that there exist innumerable fine crystals thereof that are viewed in the form of an emulsion, the incident light rays projecting into the frit are reflected from the crystals of the fluormicas and, in addition, even when they pass through the crystals of the fluormicas, the light rays are reflected by the many crystals of the calcium fluoride which surround each of the crystals of fluormicas and the colors and patterns of the fluormicas can be viewed distinctly by the viewer. In other words, the incident light rays projecting on the fluormicas are mostly prevented from passing through the fluormica crystals by the innumerable crystal grains of the calcium fluoride and are given multi-reflections and multi-refractions by those crystals, so that the color of the fluormicas of the product can be recognized much better by the viewer than the color of the foregoing proposed product in which only the fluormica crystals are present.

The resultant coloring of the frit can be given stably by the calcium fluoride.

In addition, the calcium fluoride crystals including the coloring metallic ion has the same but lighter color as the color of the fluormica, and thereby the product can be given the same total dark and light colors both by the fluormica and the calcium fluoride.

The crystals of calcium fluoride can be produced even when the crystallizing heat-treatment is carried out at a comparatively low temperature. Therefore, even when the amount of crystals of the fluormica produced by heating at a low temperature range is small, the visibility of the color of the fluormica in the glass-ceramic product is increased by the aid of the coexistence of the calcium fluoride crystals, as compared with the previously proposed product which contains the fluormica crystals alone.

When the crystallizing heat-treatment of the frit is carried out at 600°–650° C. for about 1 hour, an emulsion of calcium compounds composed mainly of calcium fluoride is formed. In this case, the transmittance of the light is varied with the amount of the foregoing calcium fluoride. The produced amount thereof varies with the compounding or blending amounts of the constituent materials for producing the same. In most cases, the amount of the calcium fluoride produced is $\frac{1}{8}-\frac{1}{4}$ of the blended amounts of the constituent materials.

Where frit particles (average particle diameter 5 mm) are produced containing calcium fluoride but not containing fluormica, the general relationships between the amount of the calcium fluoride and the light transmittancy (wavelength 0.3–1.2 micron) are such that when the amount is 1–2%, the light transmittancy is above 80%, which gives to the frit an opal essence appearance. When the amount is 2–3%, the light transmittancy is 30–50%; when the amount is 4–5 %, the light transmittancy is 20–30%; and when the amount is 5–7%, the light transmittancy is 1–below 20%.

In general, the calcium compounds composed mainly of calcium fluoride are such that they may be present in the frit in an amount of approximately 1–10% by weight, the amount of calcium fluoride being above 7/10, that is, above 70% relative to the frit weight with the remainder being other calcium compounds.

In actual practice, according to the present invention, the coloration (hue, saturation and lightness) of the frit to be made is controlled by adjusting the amount of the calcium compounds (composed mainly of calcium fluoride) produced within the foregoing production range of about 1–10% while considering the amount of the fluormica produced from the constituent materials thereof. As far as the amount of the fluormica produced is concerned, in the foregoing low temperature range of about 550° C.–650° C., the produced amount of fluorophlogopite, fluoromuscovite of white or some substituted compounds of fluorophlogopite is above 10%, in relation to the constituent compounds used. For instance, at about 650° C., $KFe_3(FeSi_3O_{10})F_2$ and $KFe_3(BSi_3O_{10})F_2$, which are black to blackish grey, are produced in an amount of 10–20% relative to the amount of the respective constituent materials compounded for producing the same. The produced amount of fluormicas other than the foregoing kinds of fluormicas is below 10% relative to the amount of constituent materials compounded. Such amounts of fluormicas as mentioned above cannot prevent the incident light from passing through the frit, so that the color of the frit is weak and the visibility thereof is low.

However, according to the present invention, when calcium fluoride coexists in the frit, the incident light passing through the fluormicas are given multi-reflections by the innumerable particles of the calcium fluoride, so that the color of the fluormicas can be viewed distinctly by a viewer even when the production amount of the fluormica is 10–20%.

In a comparatively high temperature range of 650°–850° C., the produced amount of the coloring fluormicas is increased and, naturally, the color visibility thereof can be increased. Thus, in the foregoing high temperature range, there can be more easily obtained glass-ceramic products having various kinds of colors such as white, grey, black, brown, beige, orange, red, pink, purple, blue, dark blue, green, etc. The coloration and visibility can be further increased by the coexistence of the calcium fluoride particles.

The frit to be used as the basic material for producing the glass ceramic product is produced by mixing pieces of at least one kind of glass or constituent materials for making the glass which is to serve as the binding matrix, calcium fluoride or constituent materials for making the same and constituent materials for making at least one kind of fluormica and melting the resultant mixture by heating and then rapidly cooling the mixture. The resultant frit is usually crushed into pieces or particles.

The constituent materials for producing glass to be used as a standard are those for producing borosilicate glass. For instance, they may be the constituents used for making plate glass, bottle glass or lighting glass, or other ordinary kinds of glasses. Standard constituent materials to be used are $SiO_2$—$Al_2O_3$—$B_2O_3$—$K_2O$—$Na_2O$—$(CaO)$ which are ordinary glass compositions. As occasion demands, $P_2O_5$, ZnO, BaO, PbO, $Li_2O$, $TiO_2$, $ZrO_2$, etc. are selectively added therein.

Calcium compounds composed mainly of calcium may be produced in the frit (1) by adding a predetermined amount of calcium fluoride $CaF_2$ to other raw materials for producing the frit, (2) by combining a predetermined amount of other calcium compounds such as calcium hexafluorosilicate CaSiF and calcium oxides such as CaO, etc. or (3) by combining a predetermined amount of fluoride such as $K_2SiF_6$, $Na_2SiF_6$, $MgF_2$, etc. and glass pieces containing CaO. In the above case (2), for instance, CaO and $K_2SiF$ are mixed in amounts calculated by using the reaction formula $Ca+F_2=CaF_2$ as a calculation base. In the case where CaO is contained as one of the constituents of the composition of the glass used as a raw material, the CaO may be used as a constituent material for producing the calcium fluoride, as in the above cases (2) and (3).

The production of calcium fluoride does not take place during the step of melting the compounded constituent materials for producing the frit, but takes place at the step of reheating the frit obtained by cooling of the melt, that is, during the crystallizing heat-treatment of the frit. This is one of the characteristic features of the method of this invention.

Calcium compounds composed mainly of calcium fluoride are produced by the crystallizing heat-treatment of any of the foregoing (1)–(3) constituent materials. Among the produced calcium compounds a major part (above 70%) comprises calcium fluoride.

This is because stable crystals of $CaF_2$ begin to be produced at a comparatively low temperature, that is, about 500° C. On the other hand there are produced other calcium compounds such as compounds of the amphibole system or of the calcium silicate system but their crystals are unstable, transient and irregular and, therefore, the amount of those calcium compounds in the final product is below 30%. These compounds are also present in the frit in the form of an emulsion.

A fluoride such as $K_2SiF_6$ or the like is a strong fusing agent and, therefore, the use of a large amount thereof is not favorable for producing the frit. A large amount thereof causes an unnecessary increase in the melted body of the frit particles and therefore it is preferable that the maximum addition amount thereof should be limited to about 10% as a converted production amount of $CaF_2$ in relation to the frit weight. The minimum addition amount of the fluoride is about 1% based on the $CaF_2$ converted amount in view of the light transmittancy of the frit mentioned above.

In other words, the production amount range of about 10%–1% of the calcium fluoride is preferably used for producing various glass-ceramic products provided with desired dark or light colors and patterns and varied slight light transmittancy, etc.

The role of the fluormicas crystals is to give to the glass-ceramic product desired colors. A general structural formula of the fluormica is written as $X_{0.5-1.0}Y_{2-3}(Z_4O_{10})F_2$. In the general formula X represents cations having a coordination number of 12 and called interlayer ions. Y represents cations having a coordination number of 6 and which form octahedra, Z represents cations having a coordination number of 4 and which usually form siliceous tetrahedra.

The crystal structure of mica is such that there are upper and lower network sheets of the siliceous tetrahedra, and between the two sheets the ions of octahedra coordination are bonded. These three layers are called "tablet", and the tablets are put one upon another in layers, and between the two adjacent tablet layers thereof there are coordinated alkali metal ions or alkaline earth metal ions which are called "interlayer ions". The respective X, Y and Z of the general formula are replaceable by many kinds of ions according to the principle of isomorphous replacement, and standard mica compositions of micas basically required by this invention are such that X is $K^+$, $Na^+$, $Ba^{2+}$, Y is $Mg^{2+}$, $Fe^{2+}$, $Ni^{2+}$, $Mn^{2+}$, $Al^{3+}$, $Fe^{3+}$, $Li^{30}$, and Z is $Si^{4+}$, and $Al^{3+}$, $Fe^{3+}$, or $Li^+$ which replaces part of $Si^{4+}$. All of these standard micas are of a colorless series. In order to make them colored ones, there are also used predetermined compounding ratio amounts of constituent materials for producing respective colored fluormicas in which parts of Y and Z of the standard micas are replaced by $Fe^{2+}$, $Fe^{3+}$, $Co^{2+}$, $Co^{3+}$, $Ni^{2+}$, $Mn^{2+}$, $Mn^{3+}$, $Ti^{3+}$, $Ti^{4+}$, $Cu^{2+}$, $Cr^{2+}$, $Cr^{3+}$ according to the principle of isomorphous replacement.

The kinds of fluormicas to be produced by this invention are classified according to the kinds of metallic ions and their replaced sites as follows.

(1) Those which appear white . . . prepared by replacing Z of the standard fluormicas by $AlSi_3$, $Si_4$ or $Al_2Si_2$, etc. such as fluorophlogopite, $KMg_3(AlSi_3O_{10})F_2$; fluoromuscovite, $KAl_2(AlSi_3O_{10})F_2$; tetrasilicic fluormica, $KMg_{2.5}(Si_4O_{10})F_2$; bisilicic fluormica, $BaMg_3(Al_2Si_2O_{10})f_2$; etc. and isomorphous replaced ones thereof.

(2) Those which appear black to light grey . . . prepared by replacing Y of the standard micas by $Fe^{2+}$ or $Fe^{3+}$, such as $KMg_{1.5}Fe_{1.5}(Si_4O_{10})F_2$ . . . black, $KAlFe(AlSi_3O_{10})F_2$ . . . blackish grey, $KMg_{2.75}Fe_{0.25}(AlSi_3O_{10})F_2$ . . . light grey.

(3) Those which appear brown . . . prepared by replacing X of the standard micas by $Fe^{3+}$, such as $KMg_{2.8}Fe_{0.2}(Fe_{0.6}Al_{0.4}Si_3O_{10})F_2$.

(4) Those which appear pink . . . prepared by replacing Y of the standard micas by $Co^{2+}$, $Co^{3+}$ such as $KMg_{2.9}Co_{0.1}(AlSi_3O_{10})F_2$.

(5) Those which appear blue prepared by replacing Z of the standard micas by $Co^{2+}$, $Co^{3+}$, such as $KMg_{2.8}Al_{0.2}(Al_{0.7}Co_{0.3}Si_3O_{10})F_2$.

(6) Those which appear greenish yellow prepared by replacing Y of the standard micas by $Ni^{2+}$, $Ni^{3+}$, such as $KMg_{2.5}Ni_{0.5}(AlSi_3O_{10})F_2$.

(7) Those which appear yellowish brown, dark brown to reddish purple prepared by replacing Y of the standard micas by $Mn^{2+}$, such as $KMg_{2.8}Mn_{0.2}(AlSi_3O_{10})F_2$ . . . yellowish brown $KMg_{2.6}Mn_{0.4}(AlSi_3O_{10})F_2$ . . . dark brown.

(8) Those which appear persimmon, reddish brown, brown, etc. prepared by replacing Y of the standard micas by $Cu^{2+}$ such as $KMg_{2.5}Cu_{0.5}(AlSi_3O_{10})F_2$ . . . persimmon color.

(9) Those which appear beige prepared by replacing Y of the standard micas by $Ti^{3+}$ such as $KAlTi(AlSi_3O_{10})F_2$.

(10) Those which appear green prepared by replacing Y of the standard micas by $Cr^{2+}$, $Cr^{3+}$ such as $KMg_{2.5}Cr_{0.5}(AlSi_3O_{10})F_2$.

(11) Those replaced by plural ions appear dark brown, dark green, light red, etc. and prepared by replacing Y or Z of the standard micas by more than one kind of ion selected from $Fe^{2+}$, $Fe^{3+}$, $Co^{2+}$, $Co^{3+}$, $Ni^{2+}$, $Ni^{3+}$, $Mn^{2+}$, $Cu^{2+1}$, $Cr^{2+}$, $Cr^{3+}$, $Ti^{3+}$, etc. such as those prepared by replacing Y thereof by $Fe^{2+}$ and $Ti^{3+}$ . . . dark brown, those prepared by replacing Z thereof by $Fe^{2+}$ and $Ni^{2+}$ . . . dark green, those prepared by replacing Y and/or Z by $Cu^{2+}$ and $Ti^{3+}$ . . . light red. In this type, those which take on various other colors can be obtained by changing compounding ratios of the replacement ions and/or the amounts thereof.

According to the present invention, any desired one of the above listed fluormicas is synthesized by using constituent materials compounded for producing the same.

The compounding ratios of the constituent materials for producing glass, the constituent materials for producing calcium fluoride and the constituent materials for producing fluormica are determined from total consideration of lightness and darkness of the color(s) of a desired product to be finally obtained and temperatures and times of the sintering treatment and the crystallizing heat-treatment, etc. A typical standard thereof is that the compounding ratios of the glass producing constituent materials: calcium fluoride producing constituent materials: fluormica producing constituent materials are in the ratios of 20–70:3–15:50–70, by weight, for instance. As mentioned above, the addition amount of the fluoride as a constituent material for producing calcium fluoride is preferably about 1–10 % in terms of conversion into a produced amount of calcium fluoride. The addition amount thereof ranging from 10% to 1% is necessary for designing of the predetermined coloration of the products. Namely, various products which are different in lightness and darkness and saturation of colors (Munsell color system), i.e., different in degree of colors of darkness and lightness and in light transmittancy are obtained by adjusting the addition amount of the fluoride. For instance, in the case of producing a product with a marble-like pattern comprising semitransparent spots which have a light transmittancy of 70–80% (wave length 0.3–1.2$\mu$) and white particle-like spots having a light transmittancy of 20–30% (wavelength 0.3–1.2$\mu$) are obtained, respectively, by 3.5–5.0 wt. % calcium fluoride produced in the frit and by about 1% calcium fluoride produced in the frit.

For instance, a product with such a spotted pattern having a marble-like appearance that comprises white spots (20–30% light transmittancy at wavelength 0.3–1.2$\mu$ lightness: 9.0) in the semitransparent background can be obtained by combination of frit containing 5–10 wt. % white fluorophlogopite and 3.5–5.0 wt. % calcium fluoride (in relation to the frit weight) and frit containing 5–10 wt. % fluorophlogopite and 1 wt. % calcium fluoride. A product with such a spotted pattern having a granite like appearance that comprises light black spots (Munsell black saturation 0, lightness 6.0–8.0) dark black spots (Munsell black saturation 0, lightness 1.0–3.0) and white spots (Munsell black saturation 0, lightness 9.0) can be obtained by combination of frit containing 6–10 wt. % black fluormica, $KMg_{2.75}Fe_{0.25}(AlSi_3O_{10})F_2$, and 3.5 wt. % calcium fluoride and resulting in lightness about 6.0; frit containing the same black fluormica and 1.5 wt. % calcium fluoride, resulting in lightness 8.0; frit containing black fluormica, $KMg_{2.5}Fe_{0.5}(AlSi_3O_{10})F_2$, having 1.0–3.0 lightness, and 7–10 wt. % calcium fluoride; and frit containing 5–10 wt. % white fluorophlogopite and 3.5–5.0 wt. % calcium fluoride, resulting in lightness 9.0.

The effect of the coexistence of the calcium fluoride with the fluormica is, for instance, such that the previously proposed product containing 6–10 wt. % black fluormica crystals causes the incident light to pass therethrough and the lightness thereof is about 7.0, resulting in the visibility of the color being very weak, but if 5 wt. % calcium fluoride exists therewith, the lightness is increased to 1.0, and if 2.5–3.5 wt. % calcium fluoride exists therewith, the lightness increases to 3.0.

Thus, products with various coloration such as lightness of colors can be adjusted freely by varying the amount of the addition amount of fluoride and, accordingly, the production amount of calcium fluoride.

As mentioned above, the frit is produced from the foregoing three kinds of raw materials. A batch of the constituent materials for making the frit is melted in a heating furnace at a melting temperature of 1300°–1500° C., and the melt is poured into water or on a steel made pallet so as to be cooled rapidly under a supercooling condition which prevents the frit from crystallizing to form glassy frit.

The resulting frit is crushed to pieces of which the particle size is in the range of from 0.1 mm to 3.0 mm, and finally particles thereof are sieved so as to be suitable for use as a compounding material for making a glass-ceramic molded product.

Thus, there are prepared different or various kinds of frit particles. According to the present invention, at least one kind of the frit particles, and usually two or more kinds of frit particles, are used for making a glass-ceramic product having different colors and spotted, streaked or other desired various patterns. Namely, the frit particles are basic materials used for designing a molded product having a desired beautiful colored pattern that results from a totality of factors including colors, brightness, and darkness and lightness of colors, etc. obtained by fluormicas being crystallized or synthesized and calcium fluoride being crystallized during a crystallizing heat-treatment step. The compounding of various kinds of frit particles makes various molded products displaying various color and pattern arrangements.

By compounding plural kinds of frit particles and by the crystallizing thereof, there can be obtained, as typical examples, a product having a black granite-like appearance comprising black spots - grey spots - white spots; a product having a red granite like appearance comprising dark and light red spots - or dark and light reddish pink spots - black spots - white spots; a product having a white mica marble-like appearance comprising dark and light blue spots - white spots - black spots; a marble-like product having an onyx pattern appearance such that frit particles are fused together and different colored fluids are intermingled with each other to form intermingled streaks, lines and other products having appearances corresponding to other kinds of natural stones. In addition thereto, there can be obtained various designated artistic products having such creative beautiful appearances comprising any of spots, streaks, lines or any other creative patterns and colors that do not occur in nature by changing the combination of different kinds of frit particles and/or by changing the heating temperature for fusing or the crystallization conditions of the frit particles or by utilizing the varied degrees of light transmittancy of the frits.

A molding step is usually carried out by any of the following procedures. (A) A plurality of kinds of the frit particles are mixed directly as they are, and are molded. (B) A plurality of kinds of the frit particles are subjected to a crystallizing heat-treatment so that a predetermined amount of calcium fluoride and of the fluormicas in the frit particles may be produced prior to the frit particles being mixed together, and the crystallized frit particles are molded. (C) At least one kind of the frit particles previously crystallized and at least one kind of the frit particles not yet crystallized are mixed together and molded. The molding process is carried out by a pressure molding process or by a charging process in which the frit particles are charged into a framed refractory material casing or by any other conventional ceramic molding technique.

For instance, the pressure molding process is carried out in such a manner that a small amount of organic binder such as CMC, sodium alginate, latex, etc., is added to and mixed with a plurality of kinds of the frit particles and the resultant mixture is charged into a metallic mold, and is molded under a pressure that does not crush the frit particles, and the molded piece is taken out therefrom and is placed on a mold refractory casing coated with a lubricant and is sintered. The charging process is such that a mixture of different kinds of frit particles are charged uniformly in a framed refractory casing so as to become an equal thickness of a charged layer thereof, and is sintered.

The sintering of the frit particles is carried out by charging the frit particles into the refractory casing and placing the casing into a heating furnace. The sintering thereof is performed, for instance, in such a manner that heating is carried out so that the temperature thereof may be raised to 700° C. in 1–2 hours and thereafter may be maintained at a temperature between 700° C.–1,100° C. for a period of 1 hour.

The progress of the sintering ranges from the condition wherein only the boundary surfaces of the frit particles are fused with each other to the condition at a higher elevated temperature wherein the fusing of the frit particles progresses to the point that the frit particles are completely fused and their fused liquids may flow to be intermingled with each other to form streak patterns. The temperature and time of heating for sintering are properly set according to desired characteristics of the products such as color and patterns or the like to be produced.

The crystallizing heat-treatment is carried out by any of the following three processes:

(1) Following completion of the sintering treatment of the frit particles, the sintered body is subjected to the crystallizing heat-treatment.

(2) The sintered body is cooled to below 600° C. after completion of the sintering treatment of the frit particles and is, then, reheated to be subjected to the crystallizing heat-treatment.

(3) The sintering treatment and the crystallizing heat-treatment of the frit particles are carried out at the same time.

More particularly, process (1) is carried out by subjecting the sintered molded body to a temperature in the range of 800°–1,100° C. for 1–2 hours. Process (2) is carried out such that the sintered molded body after being cooled to below 600° C. is again heated at a rate that does not cause any damage thereof due to thermal shock thereof and then is maintained within a temperature range of 600°–800° C. for 1–2 hours. Process (3) is carried out such that the sintering and crystallizing heat-treatments are effected at the same time in a temperature range of 600°–850° C. for 1–2 hours. In such a temperature range of 600°–800° C., crystallization of the calcium fluoride is effected comparatively well, but the crystals of fluormicas produced are very small in amount and very fine in size. Accordingly, as desired, it is preferable to carry out crystallizing heat-treatment in a higher temperature range of 800°–1,100° C. for 1–3 hours, and thereby production amounts of the crystals thereof are increased and the growth of the crystals can be achieved. A crystallizing heat-treatment of the frit particles not yet sintered is carried out in the same condition as the condition used in the case where the sintered molded body is reheated for the crystallizing heat-treatment. In addition, in a case where refractoriness under load of the frit is low or in a case where the compounding amount of the glass constituent in the frit has to be increased from the standpoint of view of design of the product, the sintering treatment and crystallizing heat-treatment can be carried out at the same time in a temperature range of 600°–650° C. for 1–2 hours. This is one of the characteristic efficient features of this invention method which results in good efficiency in the manufacture of the molded product that has never been attained by the conventional method.

By the crystallizing heat-treatment, the amount of the calcium fluoride produced in the frit is greater than 70% of the calcium compounds produced as mentioned above, and the remaining 30% are calcium compounds comprising fluororichterite, fluorotremolite, etc. belonging to the amphibole system or unstable and transient compositions of calcium silicates comprising $CaO-SiO_2$, $CaO-MgO.SiO_2$ and $CaO-Al_2O_3-SiO_2-F$ systems, etc. These calcium compounds also form as an emulsion in the glass matrix.

The precipitation of crystals of calcium fluoride can be effected even at 550° C. which is the lowest temperature of the crystallizing heat-treatment. The size of the crystal thereof is as fine as 0.1 mm or below, and innumerable crystals thereof are dispersed in the frit particles.

The amount of the calcium fluoride produced in the frit reaches 10–20% in relation to the total compounding amounts of the constituent materials for producing the calcium fluoride by heating at 500°–650° C. for 2 hours; 25–30% at 650°–750° C. for 2 hours; and above 40 % at 750°–800° C. for 2 hours.

The produced amount of the fluormicas, for instance, of fluorophlogopite system reaches 10–20% in relation to the total compounding amounts of constituent materials for producing the fluormicas in the frit, at 600°–700° C. for 2 hours; 15–25% at 700°–800° C. for 2 hours; 20–30% at 800°–900° C. for 2 hours; and above 40% at 900°–1,100° C. for 2 hours. The produced amount of fluoromuscovite system and that of tetrasilicic fluormica system are ⅓–¼ of the amount of the fluorophlogopite system in the foregoing respective temperature ranges.

The glass-ceramic molded products resulting from the completion of the crystallization treatment are finished by polishing the surface thereof so as to obtain a smooth, mirror-like surface.

As described above, by optical and prismatic effects such as multi-reflections and multi-refractions caused by cooperation of the calcium fluoride and the crystallized fluormicas, the crystallized glass-ceramic molded product of the present invention has a distinct, visible and beautiful multi-colored pattern which has hitherto not been possible.

The present invention is further illustrated in conjunction with the following detailed examples.

EXAMPLE 1

One example of manufacturing products of this invention was carried out in such a manner as mentioned below.

I. Procedure for manufacturing frit particles (1) Materials

A. Constituent materials for producing glasses (% by weight)

(A - 1) $SiO_2$ 55, $Al_2O_3$ 7, $B_2O_3$ 17, $K_2O$ 6, $Na_2O$ 15

(A - 2) $SiO_2$ 58, $Al_2O_3$ 5, $B_2O_3$ 12, MgO 5, CaO 8, $K_2O$ 5, $Na_2O$ 7

B. Constituent materials for producing calcium compounds composed mainly of calcium fluoride (B - 1) Calcium fluoride (99% in purity)

(B - 2) 42.5 wt. % Calcium oxide (CaO) and 57.5 wt. % potassium fluorosilicate (B - 3) $K_2SiF_6$ as fluoride C. Constituent materials for producing various kinds of fluormicas (% by weight) listed in TABLE 1 below

TABLE 1

(% by weight)

| | Sample No. | | | | |
|---|---|---|---|---|---|
| | 1 | 2 | 3 | 4 | 5 |
| | Color | | | | |
| | Black | Light Grey | Brown | Red | Blue |
| | Composition of produced fluormica | | | | |
| | $KMg_{1.5}Fe_{1.5}$ $(AlSi_3O_{10})F_2$ | $KMg_{2.75}Fe_{0.25}$ $(AlSi_3O_{10})F_2$ | $KMg_{2.0}Mn_{0.5}$ $(Si_4O_{10})F_2$ | $KMg_{2.0}Cu_{0.5}$ $(AlSi_3O_{10})F_2$ | $KMg_{2.5}Co_{0.5}$ $(AlSi_3O_{10})F_2$ |
| $SiO_2$ | 30.6 | 34.2 | 48.5 | 33.3 | 33.3 |
| $Al_2O_3$ | 10.4 | 11.8 | | 11.3 | 11.4 |
| MgO | 12.2 | 25.5 | 20.4 | 22.3 | 22.3 |
| $K_2SiF_6$ | 22.4 | 25.5 | 22.2 | 24.3 | 23.7 |
| $Fe_2O_3$ | 24.4 | 3.0 | | | |
| CoO | | | | | 9.3 |
| NiO | | | | | |
| $Cr_2O_3$ | | | | | |
| CuO | | | | 8.8 | |
| $TiO_2$ | | | | | |
| $MnO_2$ | | | 8.9 | | |

| | Sample No. | | | |
|---|---|---|---|---|
| | 6 | 7 | 8 | 9 |
| | Color | | | |
| | White | Bluish purple | Green | Beige |
| | Composition of produced fluormica | | | |
| | $KAl_2$ $(AlSi_3O_{10})F_2$ | $KMg_{2.5}Ni_{0.5}$ $(AlSi_3O_{10})F_2$ | $KMg_{2.5}Cr_{0.5}$ $(AlSi_3O_{10})F_2$ | $KAl_2(Ti_{0.2}$ $Al_{0.8}Si_3O_{10})F_2$ |
| $SiO_2$ | 32.5 | 33.5 | 33.3 | 33.2 |
| $Al_2O_3$ | 44.0 | 11.4 | 11.4 | 41.0 |
| MgO | | 22.3 | 22.3 | |
| $K_2SiF_6$ | 23.5 | 24.3 | 23.8 | 23.5 |
| $Fe_2O_3$ | | | | |
| CoO | | | | |
| NiO | | 6.3 | | |
| $Cr_2O_3$ | | 2.2 | 9.2 | |
| CuO | | | | |
| $TiO_2$ | | | | 3.0 |
| $MnO_2$ | | | | |

(2) Mixing of raw materials for producing frits

The foregoing raw materials A, B, C were blended together in the respective ratios shown in TABLE 2 to obtain respective blending or compounding samples for frits, that is, samples Nos. 1–12, shown therein.

TABLE 2

(% by weight)

| | Sample No. of frit compounding materials | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A-1 | 50 | 60 | 40 | 40 | 30 | 20 | 20 | 70 | 20 | | | |
| A-2 | | | | | | | | | | 70 | 20 | 50 |
| B-1 | 20 | | 20 | 10 | | 30 | | 5 | 5 | | 2.8 | |

TABLE 2-continued

| | (% by weight) Sample No. of frit compounding materials | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| B-2 | | 20 | | | 15 | | 18 | | 5 | | | |
| B-3 | | | | | | | | | | 7.5 | 2.2 | 6 |
| Estimated production amount of CaF$_2$ | | | | | | | | | | (7.8) | (5) | (5.6) |
| C | 30 | 20 | 40 | 50 | 55 | 50 | 62 | 25 | 70 | 22.5 | 75 | 44 |
| Sample No. | No. 1 | No. 2 | No. 3 | No. 4 | No. 5 | No. 6 | No. 7 | No. 8 | No. 9 | No. 1 | No. 2 | No. 3 |
| Color to be made | Black | Light grey | Brown | Red | Blue | White | Bluish purple | Green | Beige | Black | Light grey | Brown |

(3) Manufacturing of frit particles

Each of the respective blended samples No. 1–12, that is, each blended batch was charged into an alumina-made crucible (1 liter in volume), and was heated by an electric furnace at a temperature of 1,400°–1,500° C., and was kept in its melted condition at a temperature of 1,350°–1,380° C. for 40–60 minutes in the furnace, and thereafter the melted body was poured into water to be cooled rapidly. The resultant solidified mass, i.e., frit, was crushed to pieces or powders having a particle size distribution comprising 15% particles of below 0.5 mm in particle diameter, 34% of 0.5–1.0 mm, 40% of 1.0–1.5 mm and 11% of 1.5–2.0 mm.

II. Procedure for manufacturing glass-ceramic molded products (1) Respective samples A–G for manufacturing glass-ceramic molded products were prepared by using the foregoing resultant frit particle samples No. 1–No. 12 as shown in TABLE 3 below.

In TABLE 3, the symbol (H) indicates that the frit particle samples No. 1, No. 3, No. 7 and No. 10 were, prior to being subjected to sintering treatments, subjected to precrystallizing heat-treatments under respective heat-treatment conditions described below:

| No. 1 | 550–600° C. | for 2 hours |
|---|---|---|
| No. 3 | 680–700° C. | for 2 hours |
| No. 7 | 820–830° C. | for 2 hours |
| No. 10 | 600–650° C. | for 2 hours |

TABLE 3

| Sample symbol | Frit particle sample No. | (by weight %) |
|---|---|---|
| A (blended) | No. 1 | 20% (H) |
| | No. 2 | 40% |
| | No. 6 | 40% |
| B (blended) | No. 2 | 25% |
| | No. 3 | 5% (H) |
| | No. 4 | 25% |
| | No. 6 | 20% |
| | No. 10 | 25% (H) |
| C (blended) | No. 5 | 50% |
| | No. 6 | 50% |
| D (blended) | No. 10 | 40% (H) |
| | No. 7 | 60% (H) |

TABLE 3-continued

| Sample symbol | Frit particle sample No. | (by weight %) |
|---|---|---|
| E (blended) | No. 6 | 50% |
| | No. 8 | 50% |
| F (blended) | No. 6 | 70% |
| | No. 9 | 30% |
| G (blended) | No. 11 | 70% |
| | No. 12 | 30% |

(2) Molding, sintering and crystallizing of the foregoing samples A–I

Each of the samples A–I of 100 parts by weight was combined with CMC of 1 part by weight and was well stirred while being controlled so that the water content of the resultant mixture may become 2–3 %, and was charged uniformly into an iron made mold, and was molded by a hydraulic molding apparatus under a pressure about 100 kg/cm$^2$, so that there was obtained a compact, i.e., a compacted molded body of 30 cm×30 cm×2 cm having a porosity of 40–45 %.

The respective molded frit bodies thus produced were placed on a refractory casing made of corderite and were heated at a rising rate of 25°–30° C. per min. and were subjected to sintering treatments and crystallizing heat-treatments described in the respective conditions shown in TABLE 4 to obtain respective glass-ceramic molded products represented by respective symbols A$_1$, B$_1$, C$_1$, C$_2$, D$_1$, D$_2$, E$_1$, F$_1$, G$_1$ and I$_1$ shown therein. Namely, the products A$_1$, B$_1$, C$_1$, G$_1$ and I$_1$ have been obtained by a process wherein the crystallizing heat-treatment was carried out following completion of the sintering treatment of the molded frit bodies. The products C$_2$ and D$_2$ have been obtained by a process wherein after the sintering treatment of the molded frit bodies was completed, each sintered body was cooled to about 200° C. in 1 hour, and then was so heated again to be subjected to the crystallizing heat-treatment. The products D$_1$, E$_1$ and F$_1$ have been obtained by a process wherein the sintering treatment and the crystallizing heat-treatment were carried out simultaneously. Each of the glass-ceramic molded products thus obtained is then polished so that the surface thereof may become mirror-like, and there are obtained finished products having beautiful appearances comprising various color and patterns as described in TABLE 4.

TABLE 4

| | Sample | | | | | | | | | |
|---|---|---|---|---|---|---|---|---|---|---|
| | A | B | C | C | D | D | E | F | G | I |
| (1) Temperature - Time Sintering | 800° C. - 30 min. | 850° C. - 40 min. | 950° C. - 30 min. | 950° C. - 30 min. | 900° C. - 120 min. | 950° C. - 30 min. | 780° C. - 180 min. | 850° C. - 120 min. | 850° C. - 40 min. | 850° C. - 40 min. |

TABLE 4-continued

| | Sample | | | | | | | | | |
|---|---|---|---|---|---|---|---|---|---|---|
| | A | B | C | C | D | D | E | F | G | I |
| (2) Temperature - Time Crystallizing | 700° C. - 60 min. | 700° C. - 60 min. | 940° C. 40 min. | 700° C. 30 min. thereafter 850° C. 30 min. | simultaneous sintering and crystallizing | 600° C. 30 min. thereafter 850° C. 30 min. | simultaneous sintering and crystallizing | simultaneous sintering and crystallizing | 700° C. - 60 min. | 700° C. - 60 min. |
| Manner of sintering and crystallizing | (1) (2) continuance | (1) (2) continuance | (1) (2) continuance | reheating | | reheating | | | (1) (2) continuance | (1) (2) continuance |
| Product sample | $A_1$ | $B_1$ | $C_1$ | $C_2$ | $D_1$ | $D_2$ | $E_1$ | $F_1$ | $G_1$ | $I_1$ |
| Specific Gravity | 2.59 | 2.58 | 2.61 | 2.65 | 2.59 | 2.65 | 2.54 | 2.58 | 2.60 | 2.55 |
| Flexural Strength kg/cm$^2$ | 620 | 670 | 580 | 640 | 600 | 685 | 580 | 545 | 575 | 565 |
| Shore Hardness | 82 | 78 | 80 | 80 | 78 | 80 | 76 | 78 | 76 | 78 |
| Color tone | Black. white. grey | Red. brown. black. light grey. white | Blue. white | Blue. white | Purple. white | Purple. white | Green. white | Beige. white | Brown. light grey | single red color |
| Pattern | Spotted | Spotted | Spotted | Spotted | Streaked | Spotted | Intermingled streaked | Spotted | Spotted | No |
| Impression of Appearance | Black granite-like | Red granite-like | Diorite-like | Hornblende Marble-like | Intermingled, creative | Intermingled, creative | Ophiolite-like | Marble-like | Creative | Creative |

EXAMPLE 2

Another example of this invention was carried out in such a manner as mentioned below.

10 wt. % of the foregoing material B-1, that is, calcium fluoride, CaF$_2$, 30 wt. % of fluormica KMg$_{2.0}$Fe$_{2.0}$(AlSi$_3$O$_{10}$)F$_2$ and 60 wt. % of glass powders obtained by crushing ordinary plate glass of which the constituents are the same as those of the glass material (A-1) described above, were mixed together and a mixture thereof was heated in a furnace at a temperature of 1,400°–1,500° C., and was maintained in its melted condition at a temperature of 1,350°–1,380° C. for 40–60 min. and thereafter the melt was poured into water. Then, the resultant solidified mass, i.e., frit, was crushed to produce frit particles having a particle size distribution comprising 15% particles of below 0.5 mm in particle diameter, 34 % of particles of 0.5–1.0 mm in diameter, 40% of particles of 1.0–1.5 mm in diameter and 11% of particles of 1.5–2.0 mm in diameter.

The resultant frit particles were mixed with the foregoing sample No.1 frit particles in a ratio of 50 to 50 in weight percent, and the resultant mixture was combined with 1 wt. % of CMC and was well agitated and was charged into a mold under pressure and the resultant compact body was placed into a muffle type electric furnace and was heated at a rate of 25°–30° C. per minute and was sintered at 800° C. for 30 min. and, successively, was crystallized at 700° C. for 60 min., to produce a product having the following properties described in TABLE 5.

TABLE 5

| Specific gravity | 2.57 |
|---|---|
| Flexural strength kg/cm$^2$ | 545 |
| Shore hardness | 75 |
| Color and pattern in appearance | Spots of Black and grey |

Thus, according to the present invention, since the glass-ceramic molded product includes not only fluormicas, but also crystals of calcium fluoride which are comparatively large in crystal size and which is much different in refractive index from the glass which is one of the components of the product, the incident light on the fluormicas can be given multiple-reflections by the crystals of the calcium fluoride and also the light passing through the fluormicas can be given multi-reflections thereby while hardly passing through the product. As a result, the colors of the fluormicas in the product can be distinctly viewed by a viewer so that the viewer can be given such an appearance or impression that the product is of very visible and distinct colors and patterns as compared with the previously proposed products including fluormicas.

Further, according to the present invention, a mixture of glass constituents, fluormica constituents and calcium fluoride constituents are heated to form frit, and at least one kind of frit particles are subjected to a sintering treatment and a crystallizing heat-treatment, so that there can be obtained a very beautiful colored and patterned glass-ceramic product and there can be produced therein crystals of the calcium fluoride at a comparatively low crystallizing heat-temperature at which a large amount of crystallization of the fluormicas cannot be produced, and accordingly the visibility of colors and patterns thereof can be improved even where the product contains a small amount of fluormicas as compared with a previously proposed product containing the same small amount of the fluormicas.

What is claimed is:

1. A crystallized glass-ceramic molded product of different colors comprising a glass matrix and dispersed therein, crystals of fluormicas of at least two kinds and crystallized calcium fluoride.

2. A crystallized glass-ceramic molded product comprising a glass matrix and dispersed therein crystals of fluormica, calcium fluoride and other calcium compounds.

3. A method of manufacturing a crystallized glass-ceramic molded product of different colors comprising the steps of, mixing constituent materials for producing at least one kind of glass, constituent materials for producing at least a first kind of fluormica and constituent materials for producing calcium compounds, the calcium compounds being mainly calcium fluoride; heating the mixture to melt the constituents; cooling and solidifying the melt to form a frit; crushing the frit to form frit particles of a first color; repeating the above steps using the constituent materials for producing a second kind of fluormica to form frit particles of a second color; charging the frit particles of the first color and the frit particles of the second color into a mold; and subjecting said particles to a sintering treatment and a crystallizing heat-treatment so that there is formed a crystallized glass-ceramic molded product of different colors comprising a glass-matrix and, disposed therein, crystallized calcium fluoride and crystals of fluormicas of different colors.

4. A method of manufacturing a crystallized glass-ceramic molded product as recited in claim 3, wherein particles of at least one color are heated to cause crystallization prior to sintering.

5. A method as recited in claim 3 or 4, wherein particles of at least one color are sintered and, successively, are subjected to the crystallizing heat-treatment.

6. A method as recited in claim 3 or 4, wherein after the particles of at least one color are sintered, the resultant sintered body is cooled and is then reheated to cause crystallizing.

7. A method as recited in claim 3 or 4, wherein sintering and crystallizing are carried out simultaneously.

8. A method as recited in claim 3, wherein the constituent materials for producing the calcium compounds which are mainly calcium fluoride are fluorides selected from $K_2SiF_6$, $Na_2SiF_6$, and $MgF_2$.

9. A method as recited in claim 3, wherein the constituent materials for producing the calcium compounds which are mainly calcium fluoride are fluorides selected from $K_2Sif_6$, $Na_2SiF_6$, and $MgF_2$ and calcium oxide.

10. A method as recited in claim 9, wherein fluorides selected from $K_2SiF_6$, $Na_2SiF_6$ and $MgF_2$ are used in an amount such that 1–10 wt. % of calcium fluoride is produced in the frit as a result of its reaction with the calcium oxide.

11. A method as recited in claim 3, wherein the temperature for the sintering treatment is from about 550° C. to about 1,100° C. and the temperature for the crystallizing heat-treatment is from about 600° C. to about 1,100° C..

* * * * *